United States Patent
Chen

(10) Patent No.: US 8,120,644 B2
(45) Date of Patent: Feb. 21, 2012

(54) METHOD AND SYSTEM FOR THE DYNAMIC CALIBRATION OF STEREOVISION CAMERAS

(75) Inventor: Tie-Qi Chen, Farmington Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 518 days.

(21) Appl. No.: 12/372,677

(22) Filed: Feb. 17, 2009

(65) Prior Publication Data

US 2010/0208034 A1  Aug. 19, 2010

(51) Int. Cl.
*H04N 13/02* (2006.01)

(52) U.S. Cl. ......................................................... 348/46

(58) Field of Classification Search ...................... 348/46
See application file for complete search history.

(56) References Cited

U.S. PATENT DOCUMENTS

| | | | |
|---|---|---|---|
| 5,727,078 A * | 3/1998 | Chupeau | 382/154 |
| 2004/0054488 A1* | 3/2004 | Mai | 702/104 |
| 2005/0237385 A1* | 10/2005 | Kosaka et al. | 348/42 |
| 2006/0095207 A1* | 5/2006 | Reid | 701/301 |
| 2006/0140510 A1 | 6/2006 | Wallace et al. | |
| 2007/0071311 A1* | 3/2007 | Rovira-Mas et al. | 382/154 |
| 2007/0185946 A1* | 8/2007 | Basri et al. | 708/200 |
| 2009/0010490 A1* | 1/2009 | Wang et al. | 382/103 |
| 2009/0195371 A1* | 8/2009 | Camus | 340/435 |
| 2010/0004784 A1* | 1/2010 | Chang et al. | 700/259 |

FOREIGN PATENT DOCUMENTS

WO  2007/072102  6/2007

* cited by examiner

*Primary Examiner* — Jerry Dennison
(74) *Attorney, Agent, or Firm* — Sally J. Brown; Brinks Hofer Gilson & Lione

(57) ABSTRACT

The present invention generally provides a method of performing dynamic calibration of a stereo vision system using a specific stereo disparity algorithm adapted to provide for the determination of disparity in two dimensions, X and Y. In one embodiment of the present invention, an X/Y disparity map may be calculated using this algorithm without having to perform pre-warping or first finding the epipolar directions. Thus information related to camera misalignment and/or distortion can be preserved in the resulting X/Y disparity map and later extracted.

12 Claims, 5 Drawing Sheets

METHOD AND SYSTEM FOR THE DYNAMIC CALIBRATION OF STEREOVISION CAMERAS

FIELD

This invention relates generally to stereovision camera and imaging systems. More specifically the present invention relates to a method of analyzing stereo vision images to create an X/Y disparity map.

BACKGROUND

The development of technology related to automotive safety has shifted over the past decade from reactive systems, such as seatbelt, airbags, and occupant detection, to active systems, which include, for example, adaptive cruise control and collision avoidance. The effectiveness of the control algorithms used in these active systems may be enhanced through the use of monocular or stereovision camera systems. Compared to monocular vision systems, stereovision systems provide additional depth information, which can lead to more accurate visual detection and optical measurements.

In human vision, one key factor in analyzing 3-dimensional information is the existence of disparity between images received using the left eye and the right eye. Stereovision systems, which use two cameras to increase field of view, thereby, overlapping and improving range resolution, attempt to utilize the known principles associated with human vision. The range (R) resolution can be determined from the disparity between images according to the calculation described in Equation 1, where $f_x$ is the focal length given in pixels of the camera lens in one direction (e.g., the X direction), B is the baseline distance between the two cameras, and $d_x$ is the disparity in the specified X direction. In order to differentiate between objects at various depths, a disparity map must first be determined, which means that, for every pixel location in the left image, the corresponding pixel location in the right image must also be determined. The process for determining such a disparity map can become very computationally time consuming and expensive.

$$R = \frac{f_x \cdot B}{d_x} \quad \text{(Eq. 1)}$$

Due to limited image resolution, the disparity calculation will not be completely accurate even in ideal cases where the local texture of the various objects being observed allow for relatively distinct separation between the viewed images. The error in the range (R) determined from Equation 1 is proportional to $R^2$. This error will increase significantly if the camera lenses are not parallel or any lens distortion exists. Thus conventional stereovision systems must be calibrated, which can also be both time consuming and expensive. This type of calibration must be done by a trained technician under controlled lighting conditions using a specially designed image template. After calibration, any change in the camera's position, which can be caused by a number of uncontrollable factors, such as aging, thermal effects, or even accidental physical movement, will result in the reintroduction of significant error in the range (R) calculation. The end result is the need to recalibrate the vision system. Therefore, a need exists to develop efficient and inexpensive methods that can be used to perform automatic dynamic calibration using nothing more than the natural images or scenes observed through the camera.

SUMMARY

The present invention provides a method and system for analyzing and calibrating the stereovision image of a natural scene in order to produce an X/Y disparity map of the scene for use in the control of an adaptive or active system. One embodiment of a system, constructed in accordance with the teachings of the present invention, generally comprises a first sensor and a second sensor adapted to capture first and second image data of a scene and a processing unit capable of applying a predetermined algorithm to the first and second image data to determine an X/Y disparity map without pre-warping or finding the epipolar directions. The processing unit may also include a calibration module, which is in contact with the first and second sensors, and is capable of dynamically estimating the pitch, range, and yaw errors that are present. The processing unit can correct the X/Y disparity map for the errors estimated by the calibration module.

According to yet another aspect of the present invention, a method of determining an X/Y disparity map includes capturing first and second image data of a scene using a plurality of sensors or cameras. Pyramidal decomposition is applied to this image data to produce a plurality of decomposition levels with each level having a set of image pairs derived from the image data. The image resolution at each subsequent decomposition level is lower than the image resolution at the preceding decomposition level. A stereo disparity algorithm is executed at each decomposition level with the algorithm assigning a predetermined disparity shift value to each level. The stereo disparity algorithm applies interpolation onto the image data instead of onto derived disparity data. A disparity map is determined at each decomposition level with each disparity map being subsequently combined into an initial X/Y disparity map of the scene. The disparity shift values compensate for resolution differences that exist between the decomposition levels. Finally the pitch, roll, and yaw errors associated with angular misalignment of the first and second sensors are dynamically estimated on the captured image data and these error estimates are used to determine a final X/Y disparity map.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
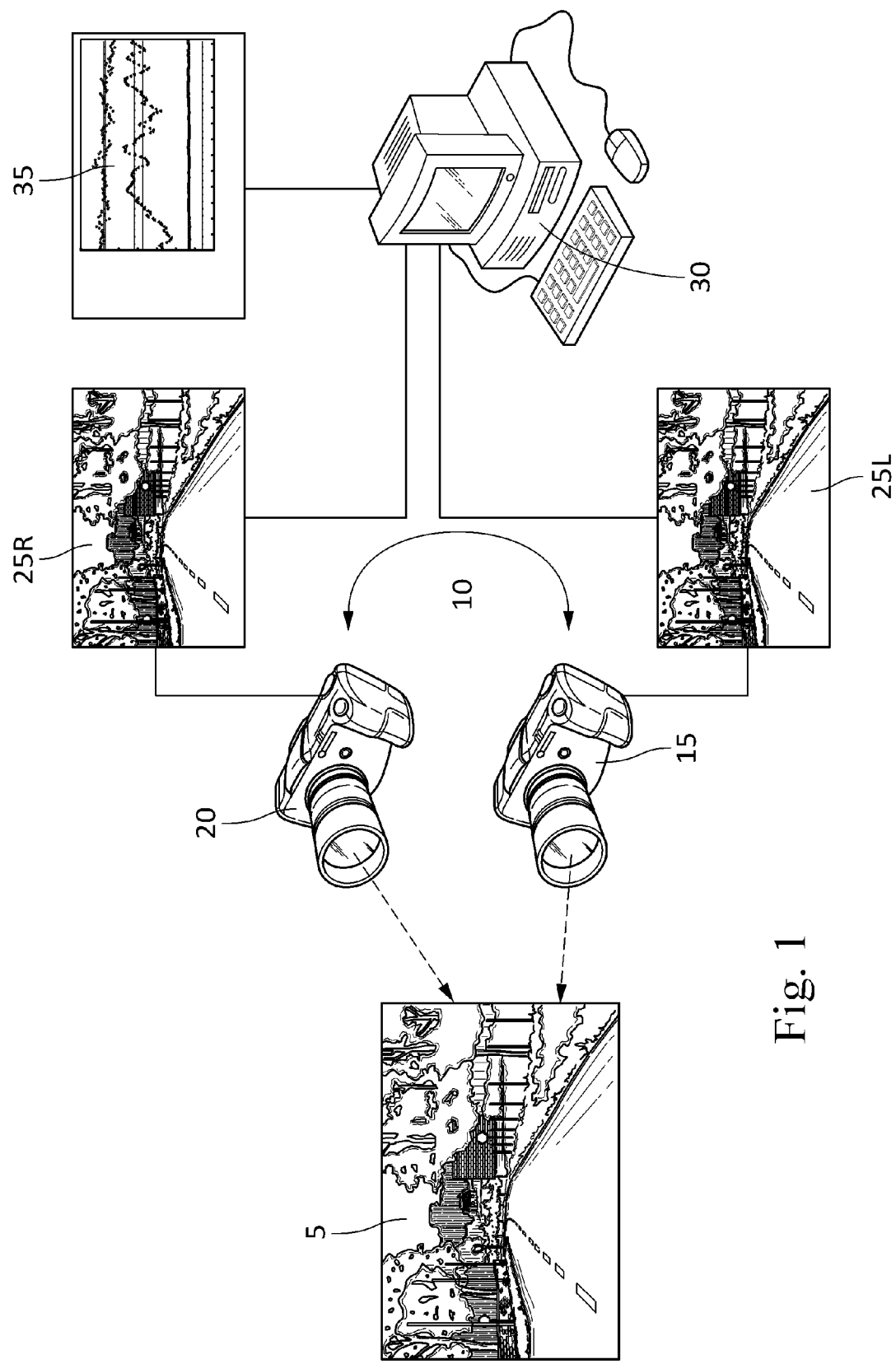
FIG. 1 is schematic representation of a stereovision system according to one embodiment of the present invention.

The following description is merely exemplary in nature and is in no way intended to limit the present disclosure or its application or uses. It should be understood that throughout the description and drawings, corresponding reference numerals indicate like or corresponding parts and features.

The present invention generally provides a method of performing dynamic calibration of a stereo vision system using a specific stereo disparity algorithm adapted to provide for the determination of disparity in two dimensions, X and Y. In one embodiment of the present invention, an X/Y disparity map may be calculated using this algorithm without having to perform pre-warping or first finding the epipolar directions. Thus information related to camera misalignment and/or distortion can be preserved in the resulting X/Y disparity map and later extracted.

Referring to FIG. 1, a stereovision system 10 is shown that comprises a left camera (i.e., first sensor) 15 and a right camera (i.e., second sensor) 20 adapted to observe a scene 5 in real time. Both cameras 15, 20 generate a digital image 25L, 25R of the observed scene. The system further comprises a processing unit 30 that includes a calibration module 35 capable of dynamic calibration with respect to pitch, range, and yaw error. The processing unit is capable of applying predetermined algorithms and transforms to the digital image and calibration data to calculate an X/Y disparity map.

Figure 2:
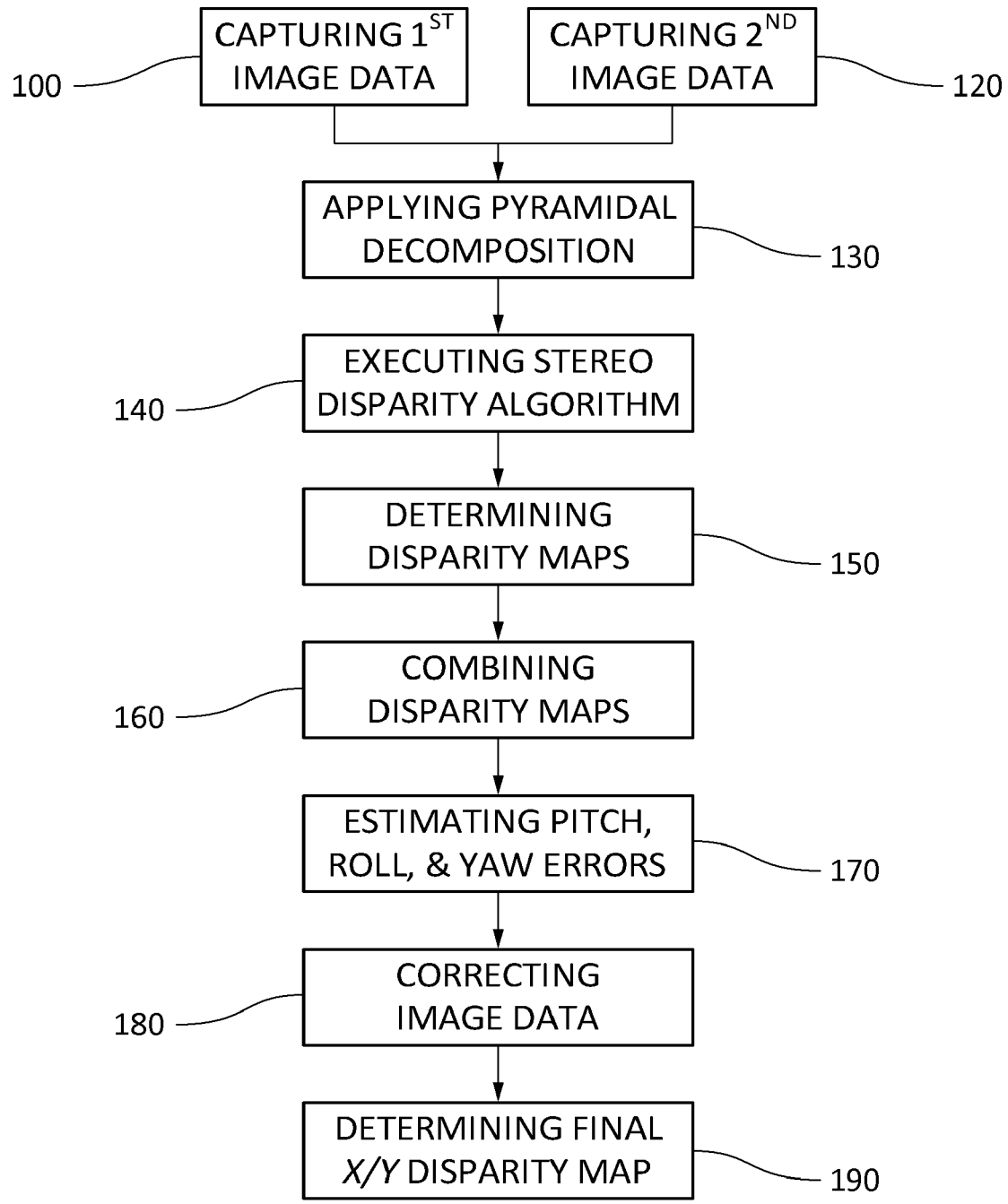
FIG. 2 is a schematic representation of a method for analyzing the stereovision image of a natural scene according to one embodiment of the present invention.

Referring now to FIG. 2, a method 100 for analyzing a stereovision image of a natural scene in order to produce an X/Y disparity map of the scene for use in controlling an adaptive or active system may comprise the steps of capturing 110 first image data of the scene with a first sensor and capturing 120 second image data of the scene with a second sensor. The method then applies 130 a technique known as pyramidal decomposition to the first image and second image data to produce a plurality of decomposition levels. Each of these decomposition levels has a set of image pairs derived from the first image data and second image data. A stereo disparity algorithm is then executed 140 at each decomposition level with a predetermined disparity shift value being assigned to each of these decomposition levels. This method includes determining 150 a disparity map at each of the decomposition levels and combining 160 these disparity maps to form an initial X/Y disparity map of the scene. The disparity shift values compensate for resolution differences that exist between the different decomposition levels. Finally, estimating 170 the pitch, roll, and yaw errors associated with angular misalignment of the first and second sensors on the captured image data allows for correcting 180 the image data for the errors and for determining 190 a final X/Y disparity map. One advantage of this method is that the stereo disparity algorithm applies interpolation onto the image data instead of onto derived disparity data.

According to one aspect of the present invention, a stereo disparity algorithm is independently applied 130 to each level in a series of pyramidal decomposition levels. Pyramidal decomposition levels mean that for each given image pair, multiple sets of image pairs are produced; with each set being at a different image resolution. The image resolution at each subsequent decomposition level is on the order of one-half the value determined for the previous or preceding level. Pyramidal decomposition may be performed according to any process known to one skilled-in-the-art, including but not limited to pixel resize, pixel average, Gaussian, or any wavelet decomposition process.

Upon application or execution 140 of the stereo disparity algorithm to each decomposition level, a predetermined disparity shift value is assigned to each decomposition level with the largest shift value being assigned to the lowest decomposition level, i.e., the level with the highest image resolution. The disparity maps determined 150 at each decomposition level are ultimately combined 160 together with the disparity shift values compensating for the pixel resolution differences that exist between the various decomposition levels.

The processing unit interprets each image as a continuous function ($\Psi$) equal to the summation over the entire level of two continuous gradients, represented by $G(x,y)$ for the left image and $F(x,y)$ for the right image, as shown by Equation 2. In Equation 2, the factor $(x, y)$ represents the pixel location, $(s_x, s_y)$ is the predetermined disparity shift factor, $(d_x, d_y)$ is the remaining X/Y disparity, and b is the bias intensity at each decomposition level. The solution to this disparity calculation arises when $d_x$, $d_y$, and b are minimized.

$$\Psi = [F(x+s_x+d_x, y+s_y+d_y) - G(x,y) + b]^2 \quad \text{(Eq. 2)}$$

When $d_x$ and $d_y$ are small, a Taylor expansion may be used to approximate the continuous function as shown in Equation 3 where $(F_x, F_y)$ represents the gradient of $F(x, y)$.

$$\Psi \approx \sum \left[ \begin{array}{c} F(x+s_x, y+s_y) + F_x(x+s_x, y+s_y) \cdot d_x + \\ F_y(x+s_x, y+s_y) \cdot d_y - G(x, y) + b \end{array} \right]^2 \quad \text{(Eq. 3)}$$

By letting, $\partial\Psi/\partial d_x = \partial\Psi/\partial d_y = \partial\Psi/\partial d_b = 0$, then $d_x$, $d_y$ and b can be calculated using a simple linear function as described by Equation 4. The solution for Equation 4 becomes less reliable when the determinant of the 3×3 matrix becomes too small. Therefore when this determinant falls below a fixed threshold, the image pair at that decomposition level is automatically disqualified. For cases where Y disparity is always zero, the second row in Equation 4 and the second column in the 3×3 matrix can be eliminated.

$$\begin{pmatrix} \overline{F_x^2} & \overline{F_x F_y} & \overline{F_x} \\ \overline{F_x F_y} & \overline{F_y^2} & \overline{F_y} \\ \overline{F_x} & \overline{F_y} & 1 \end{pmatrix} \cdot \begin{pmatrix} d_x \\ d_y \\ b \end{pmatrix} = \begin{pmatrix} \overline{F_x \cdot (G-F)} \\ \overline{F_y \cdot (G-F)} \\ \overline{(G-F)} \end{pmatrix} \quad \text{(Eq. 4)}$$

Since Equation 4 may be solved only when $d_x$ and $d_y$ are small, the solution of this equation is similar to, but not identical with the real solution that minimizes Equation 2. The solution of Equation 4 is then added into $(s_x, s_y)$, which becomes the disparity shift value for the next iteration. A final result or solution convergence will usually result prior to performing about 10 iterations and is highly dependent upon the value selected for the initial disparity shift value.

Preferably the calculation of the disparity starts with a zero initial disparity shift value assigned to the highest decomposition level where the disparity values are the smallest. The disparity map calculated at this higher decomposition level is then subsequently used as the initial disparity shift value to calculate the disparity map at the next lower decomposition level. The disparity maps determined 150 at different decomposition levels may be combined 160. The disparity value from a lower decomposition level is selected unless the discrepancy between successive levels exceeds a fixed threshold value or the remaining error calculated by Equation 2 is determined to be lower. This latter method is preferable since it involves one less parameter, namely, the disparity discrepancy threshold.

The analysis of stereovision images using the teachings of the present invention provides several advantages over conventional analysis methodology. First, since the disparity shift values used for $s_x$ and $s_y$ in Equation 3 are floating-point numbers, the values for F, $F_x$ and $F_y$ in Equation 4 can be calculated via bilinear interpolation. Since this interpolation is applied onto the original data (i.e. the image) instead of the calculated data (i.e. the disparity), the resulting disparity map is more accurate. In addition, since the disparity map calculated at a higher decomposition level is used as the initial disparity shift for the next lower decomposition level increasing the number of the pyramid decomposition levels does not lead to any substantial increase in computation time or expenses. Finally, the fact that the local image intensity bias can be calculated automatically at the same time eliminates the need for special preprocessing such as Laplacian pyramid decomposition or feature (e.g. edge/corner) detection. It is no longer necessary to know the range of disparity beforehand as long as the largest disparity value remains small at the highest decomposition level. One skilled-in-the-art will understand that the stereo disparity algorithm can be directly applied to calculate X/Y disparities, and motion vector field (if the image pair consists of current and previous frames instead of left and right images).

Figure 3A:
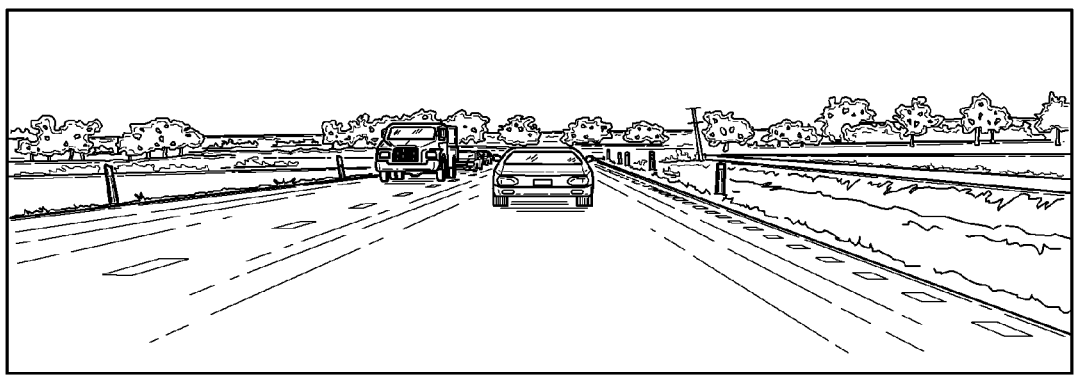
FIG. 3A is a schematic representation of an image observed by the left or first camera in a stereovision system.
Figure 3B:
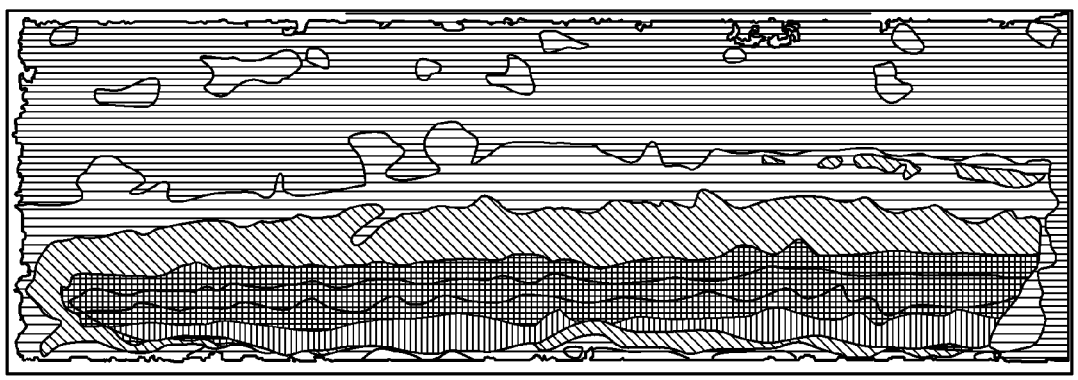
FIG. 3B is a disparity map determined for the image of FIG. 3A according to the teachings of the present invention.
Figure 3C:
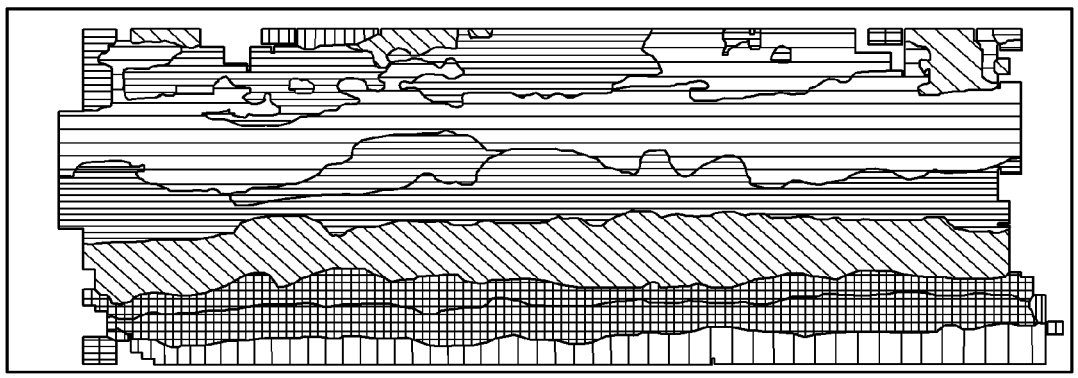
FIG. 3C is a conventional disparity map determined for the image of FIG. 3A using conventional methodology.

Referring now to FIGS. 3A-3C, results obtained in regards to creating a disparity map are depicted. In FIG. 3A, the left image observed by the stereo vision camera system 10 is shown. In FIG. 3B, an X/Y disparity map created according to the teachings of the present invention is shown. For comparison, an X/Y disparity map created utilizing conventional methodology is provided in FIG. 3C. The X/Y disparity maps in both FIGS. 3B and 3C have been smoothed using the same median filter. In addition, since both of these disparity maps are color coded according to the same grey scale, the same grey shade represents the same disparity value in both maps.

The X/Y disparity map created according to the teachings of the present invention (FIG. 3B) provides several advantages over the X/Y disparity map created in a conventional manner (FIG. 2C) First, in the ground area, the disparity values are much smoother in the horizontal direction, which better reflects the flatness of the ground surface. Secondly, more details in the scene are revealed and fewer empty "holes" are found in the disparity map shown in FIG. 3B. Finally, the edges of the various objects shown in the disparity map of FIG. 3B are observed with more detail or sharpness than the comparable object shown in the disparity map of FIG. 3C.

Misalignments can occur between cameras or between the imaging sensor and the lens within a camera. These misalignments can be angular (i.e. relative yaw, pitch, and roll), or translational (i.e. baseline error, and sensor/lens shifting relative to the optical axis) in nature. It is known that the effect of the angular misalignments can be much larger than the effect of the translational misalignments. The angular misalignments inside a camera can be combined into the angular misalignments between the cameras if these misalignments are relatively small. The overall effect of yaw error is to cause the image to move horizontally, the pitch error to cause the image to move vertically, and the roll error to cause the image to rotate around the optical axis. The pitch, roll, and yaw errors can be estimated 170 and used to correct 180 the image data in order to determine 190 a final X/Y disparity map.

If the yaw, pitch, and roll angles (denoted as $\phi_Y$, $\phi_P$, and $\phi_R$) of the right camera relative to the left camera are all very small, the error of disparity caused by this misalignment can be accurately estimated 170 according to Equation 5. In Equation 5, x and y represent the pixel location, $f_x$ and $f_y$ represent the lens focal lengths in pixels in the X and Y directions, and $d_x$ and $d_y$ represent the disparity errors in the X and Y directions. The coefficients, $(f_x/f_y)$ and $(f_y/f_x)$, for $\phi_R$ are a result of the fact that the image pixel is not always square.

$$\begin{cases} d_x = +\dfrac{f_x^2 + x^2}{f_x} \cdot \phi_Y - \dfrac{f_x \cdot y}{f_y} \cdot \phi_R \\ d_y = -\dfrac{f_y^2 + y^2}{f_y} \cdot \phi_P - \dfrac{f_y \cdot x}{f_x} \cdot \phi_R \end{cases} \quad \text{(Eq. 5)}$$

Misalignment can be a serious issue if not controlled. For example, if a stereovision system has 720×240 image resolution and a 15° field-of-view. Then $f_x$ and $f_y$ can be computed to be 2733 and 1250, respectively. For such a system, at the center of the field of view, 0.1° of yaw error can result in 4.8 pixels of disparity error or 49% of range error at the range of 50 meters; and 0.1° of pitch error can result in 2.2 pixels of row misalignment during disparity calculation.

After creating the initial X/Y disparity map according to the teachings of the present disclosure, it is another objective of the present invention to estimate 170 and correct 180 for pitch, roll, and yaw errors. The pitch error and roll error may be estimated 170 based on the simple fact that the disparity value in the Y direction should be otherwise all zeros. Thus the pitch and roll error can be estimated 170 by finding $\phi_P$ and $\phi_R$ that minimize the solution for Equation 6 where (x, y) represents the pixel location, and $d_y$ represents the calculated Y disparity.

$$\Psi = \sum [d_y(x, y) + C_P(y) \cdot \phi_P + C_R(x) \cdot \phi_R]^2 \text{ where} \quad \text{(Eq. 6)}$$

$$C_P(y) = \frac{f_y^2 + y^2}{f_y}$$

By letting $\partial\Psi/\partial\varnothing_P = \partial\Psi/\partial\varnothing_R = 0$, then $\phi_P$ and $\phi_R$ can be calculated using linear Equation 7.

$$\begin{pmatrix} \overline{C_P^2} & \overline{C_P \cdot C_R} \\ \overline{C_P \cdot C_R} & \overline{C_R^2} \end{pmatrix} \cdot \begin{pmatrix} \phi_P \\ \phi_R \end{pmatrix} = -\begin{pmatrix} \overline{C_P \cdot d_y} \\ \overline{C_R \cdot d_y} \end{pmatrix} \quad \text{(Eq. 7)}$$

Compared to estimation of pitch error and roll error, estimation of yaw error is more complex because a reference disparity map is not available unless it is a controlled scene, such as an image template at a known distance. However, road scenes that are frequently encountered include ground area that is relatively flat or smooth and occupy a substantial portion of the field of view. The range, R, as a function of vertical pixel location, y, in the image can be determined from Equation 8, where $f_y$ is lens focal length in pixels along Y direction, H is the height of the cameras above the ground, $\theta$ is the angle of the cameras tilting toward the ground, and $\alpha$ is the current vehicle pitch relative to the ground plane.

$$R = \frac{H \cdot \cos(\alpha)}{\sin(\theta - \alpha) - \frac{y}{f_y} \cdot \cos(\theta - \alpha)} \quad \text{(Eq. 8)}$$

After the range R is converted into X disparity, Equation 8 is transformed into Equation 9 where $f_x$ represents the lens focal length in pixels along X direction, B represents the baseline between the two cameras, and $d_x$ represents the horizontal disparity.

$$d_x = \frac{f_x \cdot B}{H \cdot \cos(\alpha)} \cdot \left[ \sin(\theta - \alpha) - \frac{y}{f_y} \cdot \cos(\theta - \alpha) \right] \quad \text{(Eq. 9)}$$

By taking yaw error and roll error into consideration, Equations 10, 11a, and 11b can be obtained from a combination of Equations 5 and 9.

$$d_x = d_0(x) + K \cdot y \quad \text{(Eq. 10)}$$

$$\begin{cases} d_0(x) = +\frac{f_x^2 + x^2}{f_x} \cdot \phi_Y + \frac{f_x \cdot B \cdot \sin(\theta - \alpha)}{H \cdot \cos(\alpha)} = +\frac{f_x^2 + x^2}{f_x} \cdot \phi_Y + \frac{f_x \cdot B \cdot \sin(\theta)}{H} - \Delta(\alpha) \\ K = -\frac{f_x}{f_y} \cdot \phi_R - \frac{f_x \cdot B \cdot \cos(\theta - \alpha)}{f_y \cdot H \cdot \cos(\alpha)} = -\frac{f_x}{f_y} \cdot \phi_R - \frac{f_x \cdot B \cdot \cos(\theta)}{f_y \cdot H} - \frac{\tan(\theta)}{f_y} \cdot \Delta(\alpha) \end{cases} \quad \text{(Eq. 11a)}$$

$$\text{where } \Delta(\alpha) = \frac{f_x \cdot B \cdot \cos(\theta)}{H} \cdot \tan(\alpha) \quad \text{(Eq. 11b)}$$

Since both $\theta$ and $\alpha$ are usually small, the vehicle pitch $\alpha$ has little effect on K, but a large effect on $d_0(x)$. In addition, $d_0(x)$ is almost independent of x because usually $f_x^2 \gg x^2$. According to Equations 10 and 11(a-b), the disparity map in the ground area is a surface that almost linearly depends solely on the vertical pixel location y. After calculating roll error $\phi_R$ according to Equations 6-7 and ignoring the vehicle's pitch, $\alpha$, the slope K of this surface can be calculated.

Figure 4:
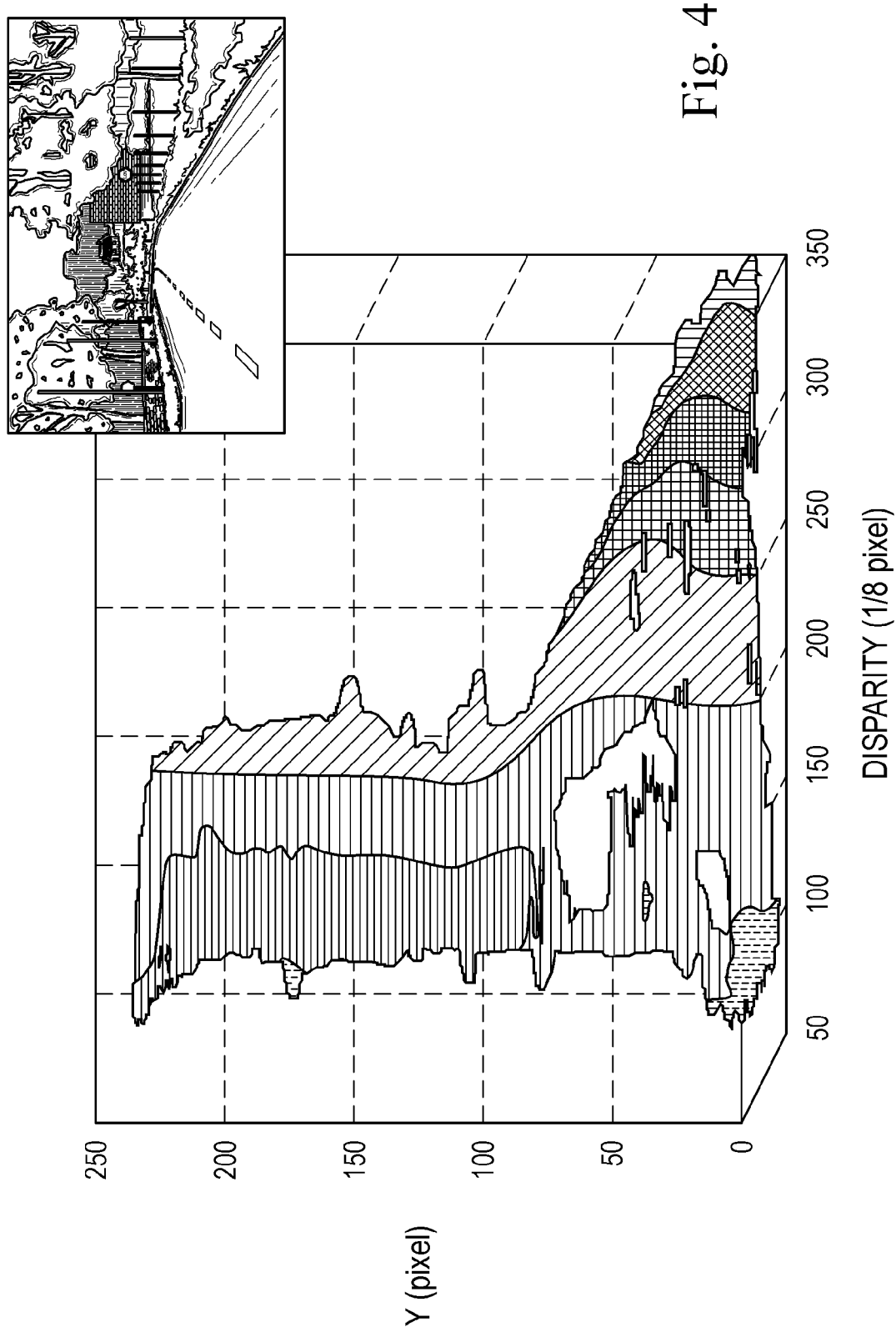
FIG. 4 is a disparity map of a surface from the ground plane plotted as a function of the Y direction.

Referring to FIG. 4 an example of the disparity map representing the surface from the ground plane obtained according to the teachings of the present disclosure is shown. The disparity map in FIG. 4 has been turned 90° sideway, and therefore it is shown as a plot of disparity vs. y. Because this surface is almost a linear plane with a fixed known slope, the disparities on this surface (i.e. the ground area) can be isolated using conventional algorithms, such as a Hugh transform.

The unknown vehicle pitch $\alpha$ can be estimated using simple lane detection techniques that detect straight lines using conventional algorithms. Once a straight section of a lane is detected in the image, the vanishing point can be easily located using the intersection of the lane edges. By letting $R = \infty$ in Equation 8 or $d_x = 0$ in Equation 9, the vertical pixel location of the vanishing point can be written as provided in Equation 12. Therefore the vehicle pitch $\alpha$ can be computed if the vertical pixel location of the vanishing point is known.

$$y = f_y \cdot \tan(\theta - \alpha) \quad \text{(Eq. 12)}$$

The yaw error can be estimated 170 by the minimization of Equation 13 provided the ground area has been isolated and the vehicle pitch $\alpha$ is known. In Equation 13, (x, y) represents the pixel location, $d_x$ is the calculated X (or horizontal) disparity, and $\Sigma$ is summation over the ground area.

$$\Psi = \Sigma [d_x(x,y) - d_0(x) - K \cdot y]^2 \quad \text{(Eq. 13)}$$

By letting $\partial \Psi / \partial \phi_Y = 0$, $\phi_Y$ can easily be calculated using Equations 14a and 14b.

$$\phi_Y = \frac{\overline{C_Y \cdot d_x} - K \cdot \overline{C_Y \cdot y} - \overline{C_Y} \cdot D_0}{\overline{C_Y^2}} \quad \text{(Eq. 14a)}$$

$$\text{where } C_Y = \frac{f_x^2 + x^2}{f_x}, \quad \text{(Eq. 14b)}$$

$$\text{and } D_0 = \frac{f_x \cdot B \cdot \sin(\theta)}{H} - \Delta(\alpha)$$

Figure 5:
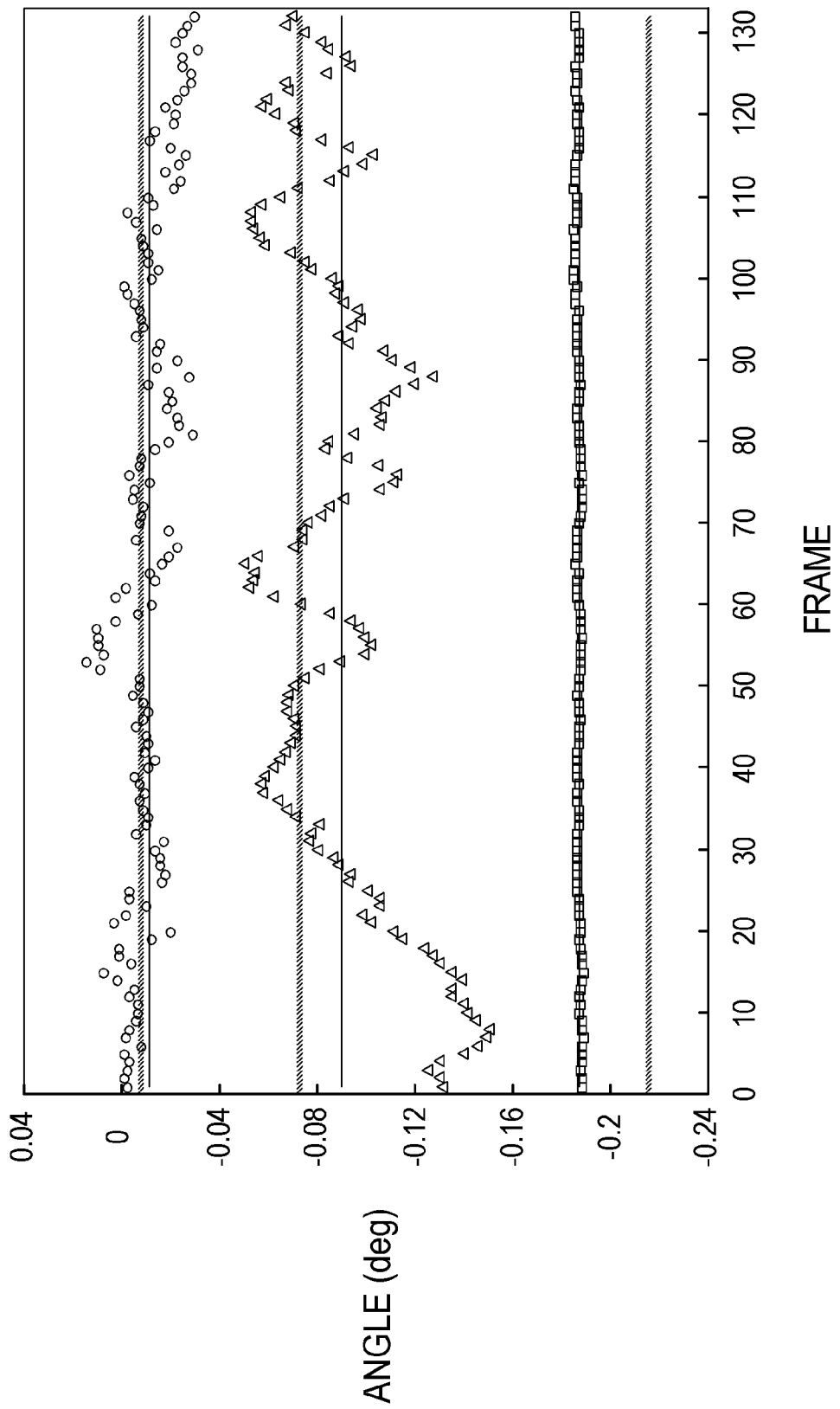
FIG. 5 is a plot of pitch, roll, and yaw errors determined during dynamic calibration of a stereovision system according to the teachings of the present invention.

Referring now to FIG. 5, an example dynamic calibration resulting from an image sequence of 132 frames is shown. In this sequence, a vehicle was moving straight forward with only one left turn near the end of the sequence (i.e. from frame #80 to frame #110). The angular misalignments were estimated 170 for every frame in the entire sequence. The yaw error is shown as triangles, the pitch error is shown as squares, and the roll error is shown as diamonds. The frame-by-frame misalignment estimation is shown as scattered data points, the average of the estimation is shown as solid lines, and the misalignment information from offline calibration is shown as dotted lines. If the vehicle pitch is assumed to be zero there will be a small difference between the actual yaw error and the frame-by-frame estimated yaw error as shown in FIG. 4. Based on Equation 14, this small difference can be determined from Equation 15 where $f_x$ is the lens focal length in pixels along the X direction, B is the baseline between the two cameras, H is the height of the cameras above the ground, $\theta$ is the angle of the cameras tilting towards the ground, and a is the current vehicle pitch relative to the ground plane. In Equation 15, it is assumed that $f_x^2 \gg x^2$ and $\cos(\theta) \cdot \tan(\alpha) \approx \alpha$, since these conditions are usually accurate.

$$\delta_{\phi Y} = \frac{\overline{C_Y}}{\overline{C_Y^2}} \cdot \Delta \alpha \quad \text{(Eq. 15)}$$

$$\approx \frac{1}{f_x} \cdot \frac{f_x \cdot B \cdot \cos(\theta)}{H} \cdot \tan(\alpha)$$

$$\approx \frac{B}{H} \cdot \alpha$$

FIG. 5 demonstrates that the estimation of the pitch error is very stable, almost independent of the scene change. This is an indication of high accuracy even though its average is about 0.028° higher than the result from off-line calibration. The estimation of the roll error is slightly less stable because, according to Equation 5, only the disparities near left and right image boundaries have significant contribution in the calculation. But the average estimated roll error is very close to the result from off-line calibration being only about 0.0037° lower. The estimation of the yaw error has the largest fluctuation due to disparities in the ground area making a significant contribution in the calculation.

The estimated 170 pitch, roll, and yaw errors can be used to correct 180 the image data displayed in the initial X/Y disparity map data in order to determine 190 a final X/Y disparity map that can be used for the effective control of an adaptive or active system. Thus after dynamic calibration, the initial X/Y disparity map may be converted into an X disparity map, which in turn can be converted into a range map using Equation 1 directly. Compared to existing algorithms, the new stereo dispersity algorithm is more accurate because it applies interpolation onto the original data (i.e. the image) instead of the calculated data (i.e. the disparity). This algorithm also replaces sequential search with directional search based on local image gradient, and therefore fewer steps are needed and the search can be conducted in two dimensions directly. With this algorithm, the X/Y disparity map can be calculated without pre-warping, and therefore the information of camera misalignment (both before and after offline calibration) can be preserved in the final X/Y disparity map and later extracted. The estimation of the pitch and roll errors is more accurate than the estimation of the yaw error. As for yaw error, the long-term average of the estimation is still fairly accurate even when the vehicle pitch is not taken into consideration. If desired to enhance stability of performance the results from dynamic calibration may be averaged or filtered over a long period of time before they are applied to the system.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of analyzing the stereovision image of a natural scene in order to produce an X/Y disparity map of the scene for use in the control of an adaptive or active system, the method comprising the steps of:
   capturing first image data of the scene with a first sensor;
   capturing second image data of the scene with a second sensor;
   applying pyramidal decomposition to the first image data and second image data to produce a plurality of decomposition levels with each level having a set of image pairs derived from the first image data and second image data and wherein the image resolution at each subsequent decomposition level is lower than the image resolution at the preceding decomposition level;
   executing a stereo disparity algorithm at each decomposition level; the algorithm assigning a predetermined disparity shift value to each decomposition level;
   determining a disparity map at each decomposition level;
   combining the disparity maps from all decomposition levels to form an initial X/Y disparity map of the scene where the disparity shift values compensate for resolution differences that exist between the decomposition levels;
   estimating the pitch, roll, and yaw errors associated with angular misalignment of the first and second sensors on the captured image data;
   correcting the image data for the pitch, roll, and yaw errors; and
   determining a final X/Y disparity map;
   wherein the stereo dispersity algorithm applies interpolation onto the image data instead of onto derived disparity data;
   wherein the pitch, roll, and yaw errors are dynamically determined each time image data is captured.

2. The method according to claim 1, wherein the first and second image data are represented by a continuous function equal to the summation of a gradient $G(x,y)$ for the first image and gradient $F(x,y)$ for the second image over the entire decomposition level.

3. The method according to claim 2, wherein the gradient for the first and second images include factors describing the pixel location, disparity shift, X/Y disparity, and bias intensity at each decomposition level.

4. The method according to claim 1, wherein pyramidal decomposition is accomplished using one selected from the group of pixel resize, pixel average, Gaussian, and a wavelet decomposition processing.

5. The method according to claim 1, wherein the disparity map determined for a decomposition level is used as the initial disparity shift value for the next lower decomposition level.

6. The method according to claim 1, wherein the X/Y disparity map is determined without pre-warping or finding the epipolar directions.

7. A stereovision system for producing an X/Y disparity map of a natural scene that can be used to control an adaptive or active system, the stereovision system comprising:
   a first sensor adapted to capture a first image data of the scene;
   a second sensor adapted to capture a second image data of the scene;
   a processor being in communication with the first sensor and the second sensor;
   the processor being configured to apply pyramidal decomposition to the first image data and second image data to produce a plurality of decomposition levels with each level having a set of image pairs derived from the first image data and second image data and wherein the image resolution at each subsequent decomposition level is lower than the image resolution at the preceding decomposition level;
   the processor being configured to execute a stereo disparity algorithm at each decomposition level; the algorithm assigning a predetermined disparity shift value to each decomposition level;
   the processor being configured to determine a disparity map at each decomposition level;
   the processor being configured to combine the disparity maps from all decomposition levels to form an initial X/Y disparity map of the scene where the disparity shift values compensate for resolution differences that exist between the decomposition levels;
   the processor being configured to estimate the pitch, roll, and yaw errors associated with angular misalignment of the first and second sensors on the captured image data;
   the processor being configured to correct the image data for the pitch, roll, and yaw errors; and
   the processor being configured to determine a final X/Y disparity map;
   wherein the stereo dispersity algorithm applies interpolation onto the image data instead of onto derived disparity data;
   wherein the pitch, roll, and yaw errors are dynamically determined each time image data is captured.

8. The method according to claim 7, wherein the first and second image data are represented by a continuous function equal to the summation of a gradient G(x,y) for the first image and gradient F(x,y) for the second image over the entire decomposition level.

9. The system according to claim 8, wherein the gradient for the first and second images include factors describing the pixel location, disparity shift, X/Y disparity, and bias intensity at each decomposition level.

10. The system according to claim 7, wherein the processor is configured to determine the pyramidal decomposition using one selected from the group of pixel resize, pixel average, Gaussian, and a wavelet decomposition processing.

11. The system according to claim 7, wherein the processor is configured to determine the disparity map for a decomposition level using the initial disparity shift value for the next lower decomposition level.

12. The system according to claim 7, wherein the processor is configured to determine the X/Y disparity map without pre-warping or finding the epipolar directions.

* * * * *